US008176805B2

(12) United States Patent
Synovzik

(10) Patent No.: US 8,176,805 B2
(45) Date of Patent: May 15, 2012

(54) SPINDLE BEARING ARRANGEMENT FOR A LONGITUDINAL SEAT ADJUSTING GEAR

(75) Inventor: Wilfried Synovzik, Huefiingen (DE)

(73) Assignee: IMS Gear GmbH, Donaueschingen (DE)

( * ) Notice: Subject to any disclaimer, the term of this patent is extended or adjusted under 35 U.S.C. 154(b) by 298 days.

(21) Appl. No.: 12/427,451

(22) Filed: Apr. 21, 2009

(65) Prior Publication Data
US 2009/0282935 A1 Nov. 19, 2009

(30) Foreign Application Priority Data

May 19, 2008 (DE) .......................... 10 2008 024 141

(51) Int. Cl.
*F16H 1/26* (2006.01)
*F16H 1/24* (2006.01)
*B60N 2/02* (2006.01)
(52) U.S. Cl. ................ 74/89.36; 74/424.74; 297/362.14
(58) Field of Classification Search ................. 74/89.23, 74/89.34, 89.36, 89.42, 424.71, 424.74, 424.94; 297/362.14
See application file for complete search history.

(56) References Cited

U.S. PATENT DOCUMENTS

| 4,023,431 A * | 5/1977 | Pavlas ........................ 74/424.94 |
| 5,103,126 A * | 4/1992 | Mehnert ........................ 310/80 |
| 5,860,319 A | 1/1999 | Via |
| 6,220,642 B1 * | 4/2001 | Ito et al. ...................... 296/65.14 |
| 6,688,667 B2 * | 2/2004 | Nishimoto et al. ......... 296/65.15 |
| 6,915,998 B2 * | 7/2005 | Borbe et al. .................. 248/429 |
| 2003/0066367 A1 * | 4/2003 | Liao ............................ 74/89.36 |

FOREIGN PATENT DOCUMENTS

| CN | 2631825 Y | 8/2004 |
| DE | 198 61 100 B4 | 9/2004 |
| FR | 2 749 053 A1 | 11/1997 |
| GB | 2 404 851 | 2/2005 |

OTHER PUBLICATIONS

Chinese Pat. Appln. No. CN 2009 014 0931.0, Office Action issued Jan. 12, 2011, 6 pages.
EPC Pat. Appln. No. 09006712.5, Search Report issued Jul. 7, 2011, 7 pages (German); 1 pages (English).

* cited by examiner

*Primary Examiner* — Justin Krause
*Assistant Examiner* — Adam D Rogers
(74) *Attorney, Agent, or Firm* — Andrew F. Young, Esq.; Lackenbach Siegel, LLP

(57) ABSTRACT

The invention relates to a spindle bearing arrangement for a longitudinal seat adjusting gear, which has a housing which can be attached by an attaching device on a vehicle-side component or on a seat component, whereby a spindle opening for guiding a spindle along a spindle opening axis runs through the housing and whereby an inner thread in the housing in the area of its spindle opening is formed to engage into a spindle run through in this manner, for shifting the housing and the spindle relative to each other along the spindle opening axis. The spindle bearing becomes advantageous in that the inner thread is formed in a spindle nut and the spindle nut is adjustably supported in the housing relative to the spindle opening axis.

7 Claims, 4 Drawing Sheets

SPINDLE BEARING ARRANGEMENT FOR A LONGITUDINAL SEAT ADJUSTING GEAR

CROSS REFERENCE TO RELATED APPLICATION

The present application claims priority from German Application Serial No. DE 10 2008 024 141.5, filed May 19, 2008, the entire contents of which are herein fully incorporated by reference.

BACKGROUND OF THE INVENTION

1. Field of the Invention

The present invention relates to a spindle bearing arrangement for a longitudinal seat adjusting gear. More specifically, the present invention relates to a housing that is able to be attached with an attaching device to a component on the side of a vehicle or a component of a vehicle seat, and whereby a spindle opening for guiding the spindle is guided along a spindle opening axis through the housing.

2. Description of the Related Art

DE 198 61 100 B4, describes a spindle and worm-gear drive for adjustment devices in motor vehicles. Therein is disclosed a spindle bearing arrangement for a longitudinal seat adjustment gear, which has a housing to admit a worm gear and a spindle. The housing is able to be attached with an attachment device on a rail of a seat frame. The housing has a spindle opening for guiding a spindle along a spindle opening axis through the housing. Within the housing, a spindle nut is placed, which is configured so as to be guided through the spindle. Thus, the spindle is inserted with positional preciseness and with no play into the spindle nut. The spindle is attached so as not to turn on a floor rail, with the rail securely connected with a floor plate of a vehicle. Such an arrangement permits the spindle to be adjusted along the housing.

FR 2 749 053 A1 describes a spindle bearing arrangement for a longitudinal seat adjustment gear with a housing which is on a floor rail and is securely attached by the floor rail with a floor plate of a vehicle. The housing has a spindle opening with an inner thread, whereby a spindle is led through the inner thread. The spindle is attached so as to rotate on a seat rail. By turning the spindle, the spindle, together with the seat rail, is shifted relative to the spatially fixed housing in the longitudinal direction of the spindle.

Unfortunately, none of the solutions has been able to appreciate what the inventors now recognize. What is clearly not appreciated by the related art is that when a vehicle is assembled, the rails often cannot be aligned exactly to each other on the floor plate. Also, the spindle is often mounted in one of the rails, either in fixed or rotatable fashion, with a tolerance. Especially when the floor rails are often screwed at a slant, the individual components are mostly not exactly aligned in their longitudinal direction. A further problem is that the spindle itself often is not fabricated to be entirely straight. The usual result is positioning errors of the individual components with a rail interval, which leads to the rail interval often changing by $4/10$ to $5/10$ mm when the housing runs along the spindle. In isolated cases, even considerably larger tolerances are provided. Owing to such manufacturing tolerances, a problem arises that a spindle drive is subject to a greater loading when the housing is shifted along the spindle in areas in which no exact alignment is present. In addition, such non-exact alignments lead to increased wear in the participating components.

Accordingly, the inventors now appreciate a heretofore unrecognized need for an improved spindle bearing arrangement for a longitudinal seat adjustment gear in such a way that the manufacturing tolerances of the spindle and the rails can be better equalized.

ASPECTS AND SUMMARY OF THE INVENTION

An aspect of the present invention is to provide a spindle bearing arrangement for a longitudinal seat adjustment gear in such a way that the manufacturing tolerances of the spindle and the rails can be better equalized.

The present invention relates to a spindle bearing arrangement for a longitudinal seat adjusting gear, which has a housing which can be attached by an attaching device on a vehicle-side component or on a seat component, whereby a spindle opening for guiding a spindle along a spindle opening axis runs through the housing and whereby an inner thread in the housing in the area of its spindle opening is formed to engage into a spindle run through in this manner, for shifting the housing and the spindle relative to each other along the spindle opening axis. The spindle bearing becomes advantageous in that the inner thread is formed in a spindle nut and the spindle nut is adjustably supported in the housing relative to the spindle opening axis.

According to an embodiment of the present invention there is provided a spindle bearing arrangement for a longitudinal seat adjustment gear, said arrangement comprising a housing that is able to be attached with an attaching device to a vehicle-side component, a component on a side of a vehicle or to a component of a seat of said vehicle. A spindle opening is guided along a spindle opening axis through the housing for guiding a spindle through, and whereby an interior thread in the housing in the area of its spindle opening is configured to engage into such a spindle guided through, for shifting the housing and the spindle relative to each other along the spindle opening axis. The spindle bearing becomes advantageous in that the interior thread is created in a spindle nut and the spindle nut is adjustably supported in the housing relative to the spindle opening axis.

At least a section of the spindle opening may have a larger inner diameter than the diameter of the spindle. With this the inner diameter is larger particularly in the outside direction along the spindle opening axis by an amount that the spindle is able to be sufficiently tipped and/or shifted relative to the spindle opening axis within the spindle opening, lateral to its spindle axis, to be able to equalize installation tolerances particularly of the spindle relative to the seat rails.

The spindle nut can be adjustably supported in the housing in a lateral direction to the spindle opening axis. A play thus produced along the lateral direction can be as large as desired in theory. However, in practical terms, a play limited to several tenths of a millimeter up to one millimeter for shifting the spindle nut can suffice to equalize installation tolerances of the spindle or additional components, especially of a longitudinal seat adjustment drive. Thus in this lateral direction, transverse to their long dimension, curved spindles or seat rails, or ones bent by installed pre-stresses, can advantageously be equalized.

The spindle nut can be rotatably supported in the housing by an angle about a turning axis running in a direction lateral to the spindle opening axis. Such an angle can be as large as desired in theory. In practical terms, however, an angle limited to a few degrees can suffice to equalize installation tolerances of the spindle or additional components, especially of a longitudinal seat adjustment drive. Thus in this lateral direction, transverse to their long dimension, curved spindles or seat rails, or ones bent by installed pre-stresses, can advantageously be equalized.

According to a first embodiment form, this lateral direction runs in the direction of an element of the attaching device and/or transverse both to the spindle and the element on the seat or floor, through it. Thus, any lack of precision of a distance of rails and/or the spindle can be advantageously equalized in the direction of the seat or floor.

According to a second alternative embodiment form, this lateral direction runs parallel to the long dimension of an element of the attaching device and/or parallel to a flat extension of an element of the attachment arrangement and transverse to spindle opening axis X. Thus, any lack of precision of a course of rails and/or the spindle, transverse to the direction to the seat or floor, i.e., in a plane parallel to the vehicle's floor, can advantageously be equalized.

With such spindle bearing arrangements, the inner thread in the spindle nut is preferably configured for rotatable but play-free uptake of the spindle.

Preferably the spindle nut is elastically supported in the housing by means of at least one damping element. Noises when the spindle nut is displaced within the housing are avoided or attenuated, since the spindle nut and the housing, which are manufactured from a hard material, preferably from metal, cannot abut each other directly. In particular, they can be dampened by elastomer or rubber supports.

Also independently advantageous is a corresponding spindle drive in a longitudinal seat adjustment drive with a spindle bearing arrangement configured in this way.

Thus, what is provided is a spindle bearing arrangement for longitudinal seat adjustment gears for equalizing misalignments of the seat lower rails and the seat upper rails by a turnable and/or shiftable supporting of the spindle nut in the housing. Thus, between the seat lower rail and seat upper rail, as well as the spindle guided therein if necessary, misalignments can be compensated for, which make allowance for customary manufacture-related tolerances with seat rails for longitudinal adjustment. Misalignments are also compensated which arise during operation when the seat is subjected to a load in excess of the customary load. A further advantage consists in the possibility to machine the individual components employed in simple fashion. Along with the spindle nut being adjustable within the housing, another advantageous aspect is the housing parts being mobile in the rail or the spindle being mobile in the spindle opening that guides through the housing. Optionally, a retainer can be provided to secure the housing with a rectangular recess as well as an elastomer to admit and/or to insulate the spindle nut.

Such a spindle bearing arrangement is usable both with embodiment forms with a spindle fixed in a rail and also with an embodiment form with a spindle supported so as to rotate in a seat rail.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
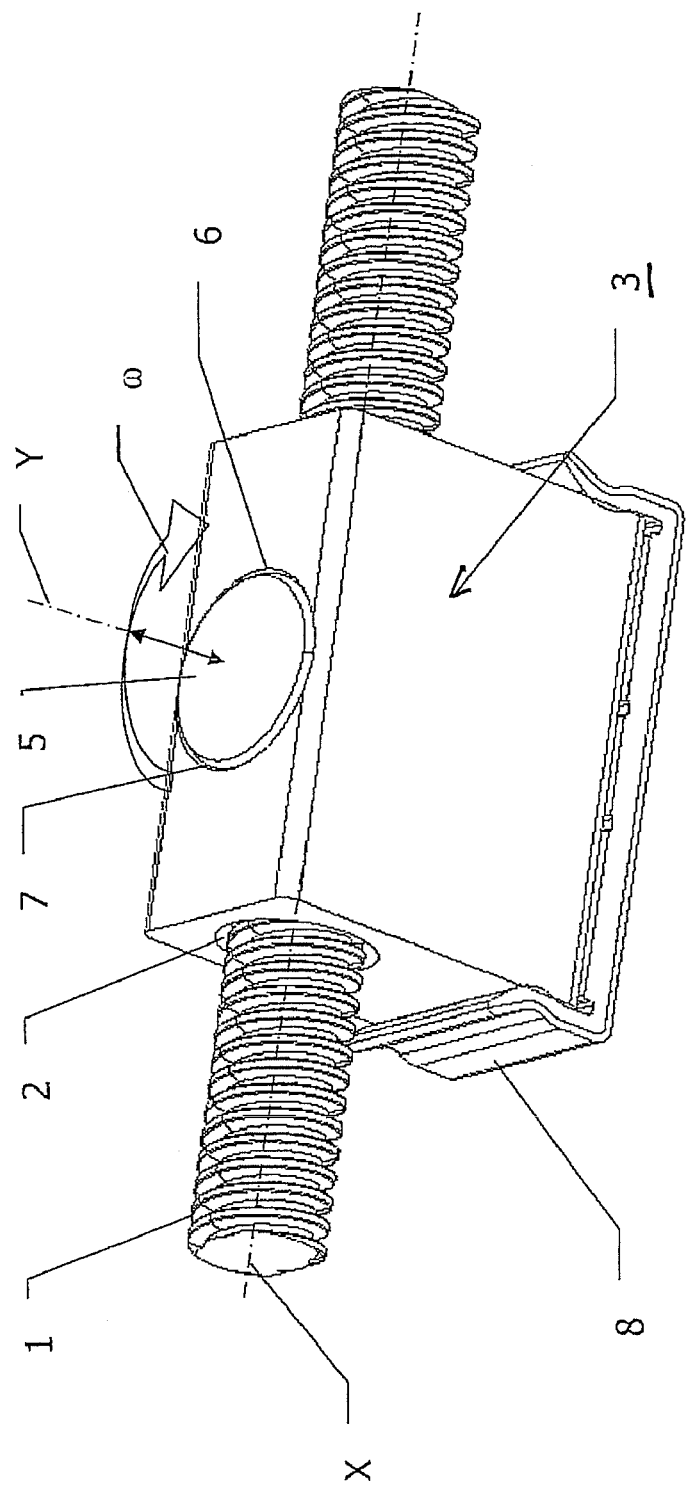
FIG. 1 is a perspective view of a housing of a spindle bearing arrangement with a spindle nut adjustably placed in the housing and a spindle leading through the housing and through the spindle nut.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
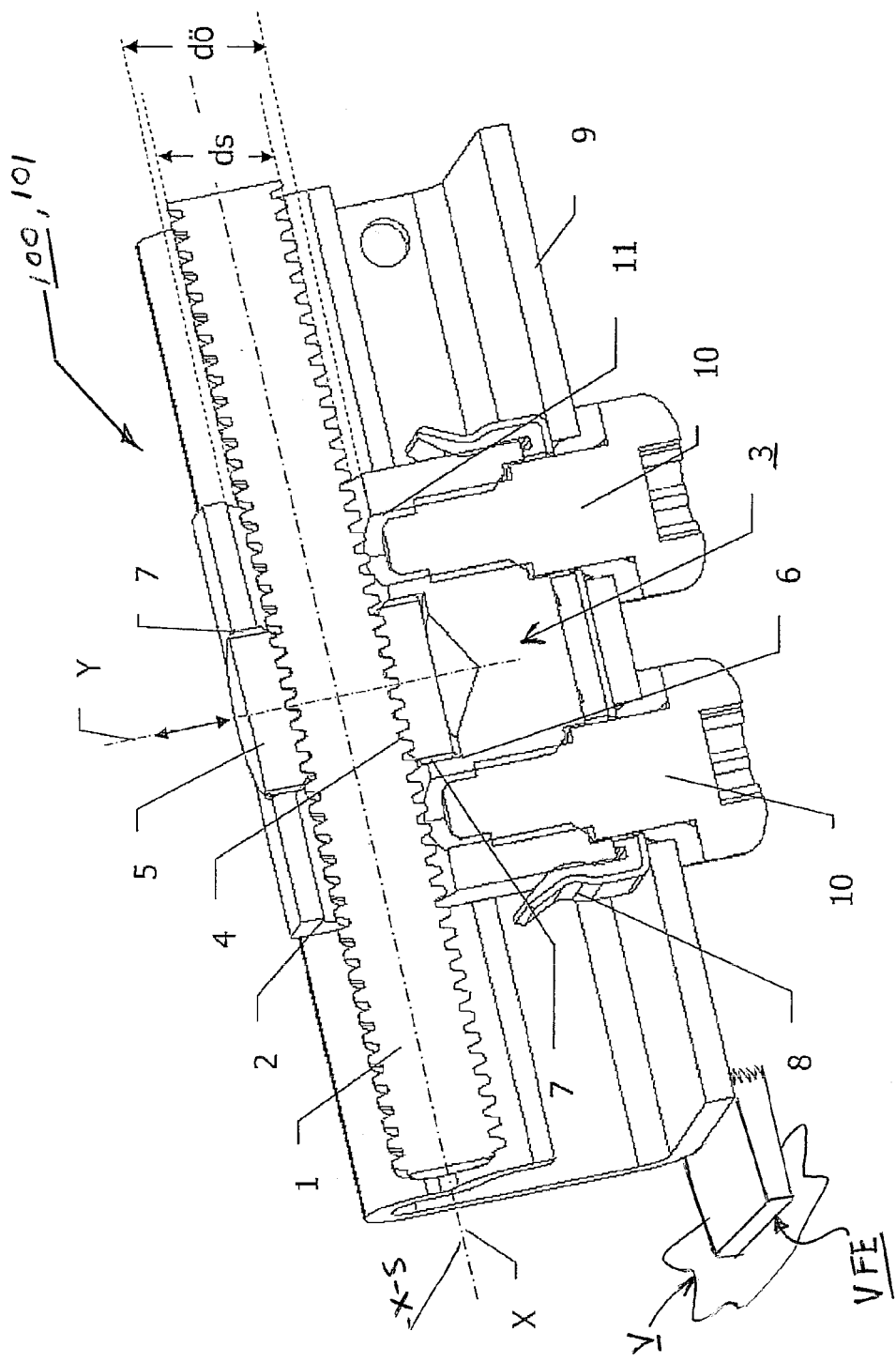
FIG. 2 is a sectional view through the spindle bearing arrangement as shown in FIG. 1.

FIG. 1 and FIG. 2 show a spindle 1, which leads through a spindle opening 2 of a housing 3. Spindle 1 uses its external thread to engage, preferably with positional preciseness, into an inner thread 4 of a spindle nut 5. Spindle nut 5 is formed in a spindle nut receptacle 6, which is configured as a free space within housing 3.

Spindle nut receptacle 6 and the spindle nut 5 are provided with dimensions such that spindle nut 5 is adjustable in housing 1 relative to a spindle opening axis X of spindle opening 2, especially supported so as to be able to be shifted and tipped laterally.

To offer sufficient space for shifting the spindle nut 5 and spindle 1 guided within it relative to spindle opening 2, opening 2 has an inner diameter do larger than the diameter ds of spindle 1. By this means, spindle 1 can be shifted within spindle opening 2 laterally, or be tipped. In connection with a spindle nut receptacle 6 that is dimensioned to be appropriately large, spindle 1 can thus be tipped, preferably both about a point within spindle nut 5 with a spindle axis X-S relative to spindle opening axis X, and also shifted in a lateral direction Y to spindle opening axis X. Spindle opening 2 and the spindle axis X-S are thus not congruent in most of the adjustable positions when shifted to compensate for misalignments.

Spindle nut receptacle 6 preferably is embodied as a cylindrical space, which extends bilaterally in the lateral direction Y to spindle opening axis X in housing 3. The spindle nut 5 inserted in cylindrical spindle nut receptacle 6, which is preferably embodied as a cylindrical body, so that spindle nut 5 can be rotated about the rotating axis of spindle nut 5 extending in lateral direction Y by an angle ω.

Preferably, spindle nut receptacle 6 is embodied to be long enough so that spindle nut 5 can be shifted along its rotational axis in direction Y lateral to spindle opening axis X. The guide-through opening with the inner thread 4 which leads through spindle nut 5 for guiding spindle 1, is guided through transversely to the rotational axis of spindle nut 5 through the body of spindle nut 5.

Preferably the spindle nut receptacle 6 on one side leads in the direction of the rotational axis of inserted spindle nut 5 through the wall of housing 3 to the outside of housing 3. This makes assembly easier, since spindle nut 5 can be inserted in a first step from the outside into spindle nut receptacle 6, in order in a subsequent second step to guide the arrangement out of housing 3 with spindle nut 5 inserted therein.

Preferably, in an area between the inner wall of spindle nut receptacle 6 and the outer wall of spindle nut 5, one or more damping elements 7 made of an elastic material are used. Damping elements 7 are so constituted that spindle nut 5 within housing 3 retains sufficient play to shift especially in lateral direction Y and to rotate about a required angle ω. Also, lateral tipping of spindle 1 relative to spindle opening axis X is given at least limited support by use of such damping elements 7.

FIG. 2 especially provides a sketch of how an attaching device 100 is provided for attaching housing 3, which consists of multiple components as necessary. With an exemplary attaching device 100, a securing clamp 8 encompasses housing 3 from three sides, whereby the long side of retaining clamp 8 in its middle section runs parallel to spindle opening axis X. The side legs of securing clamp 8 thus surround a part of housing 3 in an adjustment direction of spindle 3 relative to a rail 9 on which the securing clamp 8 is attached, for example by means of screws 10. For attachment of the screws 10, corresponding attachment boreholes lead through rail 9 and securing clamp 8 in alignment to corresponding attachment boreholes 11, which lead into the body of housing 3, to screw these components to each other.

With the first embodiment form sketched using FIGS. 1 and 2, the alignment of spindle nut receptacle 6 and spindle nut 5 is so chosen that the lateral direction Y runs transverse to spindle 1 and transverse to rail 9, whereby the rotational axis of spindle nut 5 thereby cuts through both spindle 1 and rail 9. Thus the lateral direction Y leads in the direction of a floor attaching element in the form of rail 9 of the attaching device 100 or to a corresponding seat rail with a reversed configuration each respectively joined to a vehicle floor element VFE of a vehicle V. In other words, the lateral direction Y runs transverse both to the spindle 1 and to the seat attaching element or floor attaching element and through them.

Figure 3:
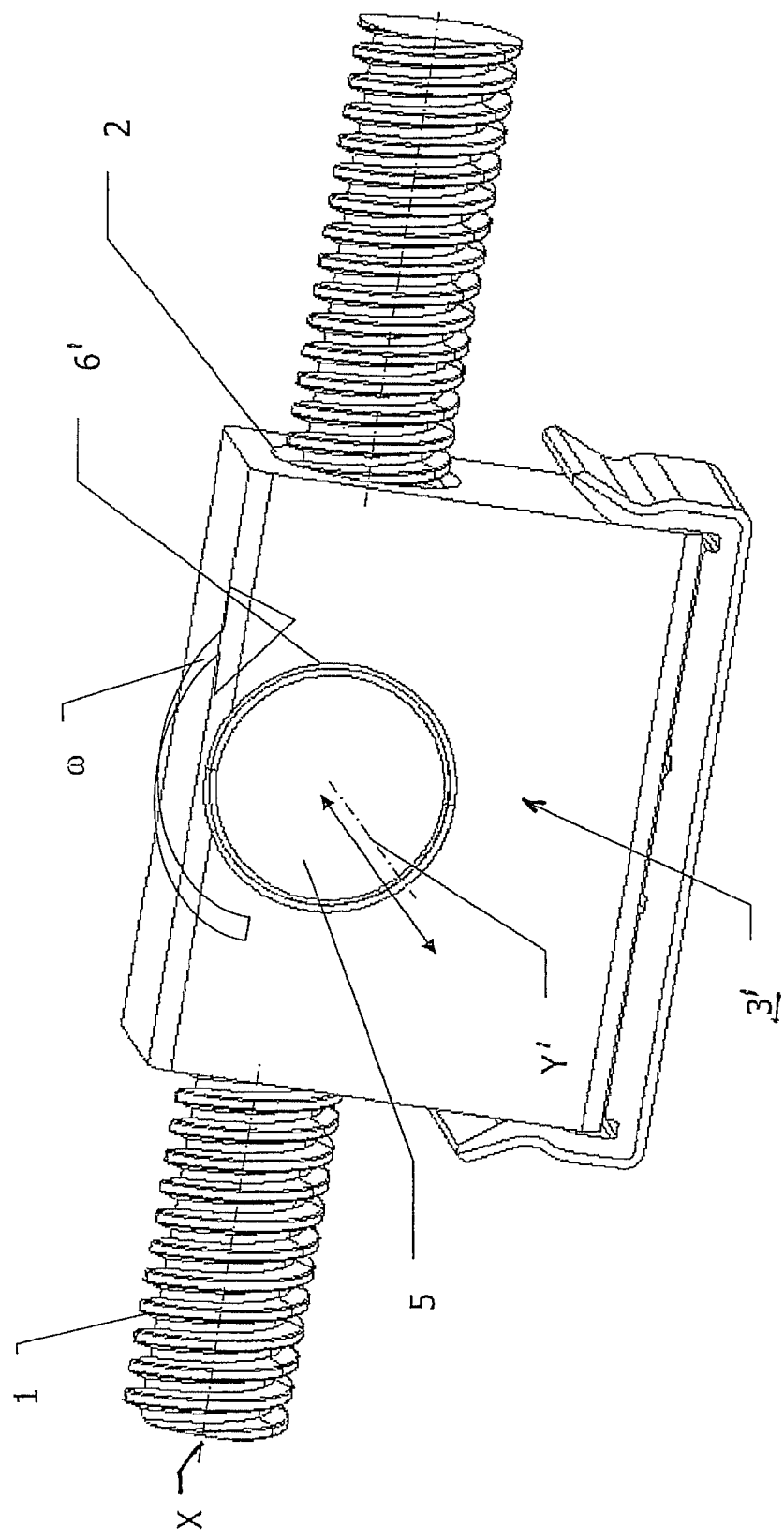
FIG. 3 is a perspective view of an alternative embodiment of such a spindle bearing arrangement.
Figure 4:
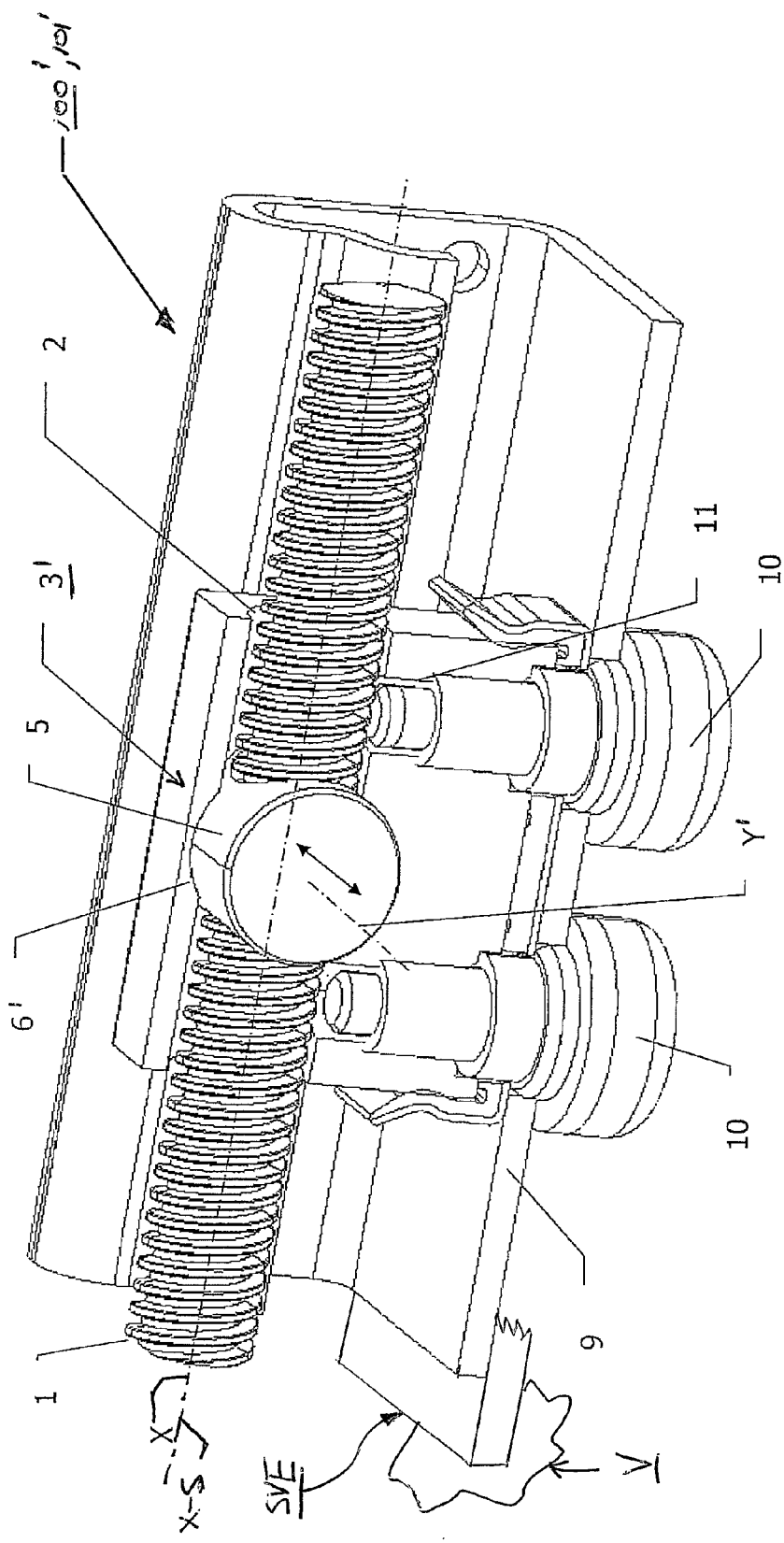
FIG. 4 is a sectional view through the spindle bearing arrangement as shown in FIG. 3

According to the second embodiment form sketched using FIGS. 3 and 4, with an attaching device 100' the spindle nut receptacle 6' and the lateral direction Y' are so situated in housing 3' that lateral direction Y' runs parallel to the long dimension of the element in the form of seat rail 9 of the attaching device and transverse to spindle opening axis X. In other words, the lateral direction Y' in this second embodiment form runs parallel to a flat extension of the seat or the floor rail 9 to a vehicle seat element VSE of a vehicle V.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A spindle bearing arrangement for a longitudinal seat adjustment gear, said arrangement comprising:
  a housing that is operably attached to an attachment device of said seat adjustment gear to an external vehicle:
  (a) whereby a spindle opening for guiding a spindle is guided along a spindle opening axis through said housing; said spindle opening having an inner diameter larger than an outer diameter of said spindle;
  (b) whereby an inner thread is formed in a spindle nut and said spindle nut is adjustably supported in said housing relative to said spindle opening axis so as to threadably engage said spindle during a guiding of said spindle therethrough, operable to permit:
    (i) a slidable shifting of said spindle nut relative to said housing and perpendicular to said spindle opening axis of said housing during said guiding, and
    (ii) a slidable shifting of said spindle relative to said housing and perpendicular to said spindle opening axis of said housing during said guiding; and
    (iii) a pivotable shifting of both said spindle nut and said spindle relative to said housing and along a direction transverse to said spindle opening axis during said guiding;
  (c) said housing defining a bounded cylindrical space arranged perpendicular to said spindle opening axis;
  (d) said spindle nut being a cylindrical body and defining a spindle nut rotating axis perpendicular to said spindle opening axis;
  (e) said spindle nut being operable about said spindle nut rotating axis a pivotable shifting angle in a direction lateral to said spindle opening axis during said guiding; and
  (f) said spindle nut pivotably and shiftably received in said bounded cylindrical space in said housing thereby enabling said slidable shifting and said pivotable shifting during said guiding.

2. A spindle bearing arrangement, according to claim 1, in which said direction lateral to said spindle opening axis runs in a direction of along a rail of the attachment device.

3. A spindle bearing arrangement, according to claim 1, in which said direction lateral to said spindle opening axis runs in a direction parallel to a long dimension of a rail of the attachment device.

4. A spindle bearing arrangement, according to claim 1, in which said inner thread is formed in said spindle nut to receive said spindle in a turnable, but play-free fashion.

5. A spindle bearing arrangement, according to claim 1, in which said spindle nut is elastically supported by means of at least one damping element in the housing.

6. A spindle bearing arrangement for a longitudinal seat adjustment gear, said arrangement comprising:
  a housing that is operably attached to an attachment device of said seat adjustment gear:
  a spindle opening in said housing having an inner diameter and defining a spindle opening axis;
  a threaded spindle having a spindle axis and an outer diameter less than said inner diameter of said spindle opening;
  a spindle nut threadably engaging said threaded spindle in said spindle opening and threadably guiding, said spindle therethrough during a use;
  said housing defining a cylindrical space arranged perpendicular to said spindle opening;
  said spindle nut having a cylindrical body and defining a spindle nut axis perpendicular to said spindle opening axis;
  said spindle nut rotatably and slidably received in said cylindrical space of said housing, whereby said spindle nut is slidable in and out of said cylindrical space of said housing perpendicular to said spindle opening axis during said use and said spindle nut is rotatable a pivotable shifting angle in a direction lateral to said spindle opening axis during said use; and whereby said threaded spindle is slidably shiftable perpendicular to said spindle opening axis and both said threaded spindle and said spindle nut are operatively pivotable during said use lateral to said spindle axis opening.

7. A spindle bearing arrangement, according to claim 6, further comprising:

at least one dampening element;

said at least one dampening element operably bounding said cylindrical body of said spindle nut; and said at least one dampening element being in said cylindrical space arranged perpendicular in said housing.

* * * * *